United States Patent
Jiang et al.

(10) Patent No.: US 12,118,018 B2
(45) Date of Patent: Oct. 15, 2024

(54) DATA CLASSIFICATION METHOD AND APPARATUS, DEVICE AND STORAGE MEDIUM

(71) Applicant: ZHEJIANG LAB, Zhejiang (CN)

(72) Inventors: Ting Jiang, Hangzhou (CN); Yu Zhang, Hangzhou (CN); Ting Yu, Hangzhou (CN); Ji Zhang, Queensland (AU); Linlin Hou, Hangzhou (CN); Jin Zhao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/472,202

(22) Filed: Sep. 21, 2023

(65) Prior Publication Data
US 2024/0273118 A1    Aug. 15, 2024

(30) Foreign Application Priority Data
Feb. 8, 2023    (CN) .......................... 202310155946.4

(51) Int. Cl.
*G06F 16/28* (2019.01)

(52) U.S. Cl.
CPC .................................. *G06F 16/285* (2019.01)

(58) Field of Classification Search
CPC ...... G06F 16/9024; G06F 17/10; G06F 17/16; G06F 18/213; G06F 18/21375; G06F 18/22; G06F 18/23; G06F 18/23213; G06F 18/2323; G06F 18/24; G06F 18/2411; G06F 18/24147; G06F 18/285; G06F 18/2131; G06N 3/02; G06N 3/042; G06N 3/045; G06N 3/08; G06N 3/088; G06N 3/09; G06N 3/0455; G06N 3/0895; G06N 3/091; G06N 3/092; G06N 3/094; G06N 3/096; G06N 3/098; G06N 3/0985; G06N 20/00; G06V 10/7715; G06V 10/82
See application file for complete search history.

(56) References Cited

U.S. PATENT DOCUMENTS

| | | | |
|---|---|---|---|
| 11,531,886 B2 * | 12/2022 | Zhang | G06F 18/29 |
| 2020/0082272 A1 * | 3/2020 | Gu | G06N 3/045 |
| 2020/0285944 A1 * | 9/2020 | Lee | G06F 16/9024 |
| 2021/0064959 A1 * | 3/2021 | Gui | G06N 3/045 |
| 2021/0256355 A1 * | 8/2021 | Chen | G06N 3/08 |
| 2021/0374499 A1 * | 12/2021 | Wu | G06F 17/16 |
| 2022/0101103 A1 * | 3/2022 | Fatemi | G06N 3/088 |
| 2022/0245425 A1 * | 8/2022 | Sheikh | G06N 3/045 |
| 2023/0386237 A1 * | 11/2023 | Liu | G06V 30/19093 |

* cited by examiner

*Primary Examiner* — Robert W Beausoliel, Jr.
*Assistant Examiner* — Cheryl M Shechtman
(74) *Attorney, Agent, or Firm* — W&G Law Group (57) ABSTRACT

A data classification method and apparatus, a device and a storage medium. A structural feature of the respective node in graph data may be determined according to a neighbor node of the respective node in the graph data through a deviation between the decoded feature obtained by decoding the embedded coding feature of the respective node in the graph data and the initial feature of the respective node, and then the embedded coding feature corresponding to the respective node is adjusted according to the decoded feature of the respective node and the structural feature of the respective node in the graph data to obtain the adjusted feature corresponding to the respective node, so that accuracy of an obtained feature of the respective node is improved, and thus accuracy of data classification may be improved.

15 Claims, 5 Drawing Sheets

$$\begin{array}{c c} & \begin{array}{c c c c c} A & B & C & D & E \end{array} \\ \begin{array}{c} A \\ B \\ C \\ D \\ E \end{array} & \left[ \begin{array}{c c c c c} 1 & 1 & 0.2 & 0.4 & 0 \\ 1 & 1 & 0.2 & 0.4 & 0.4 \\ 0.2 & 0.2 & 1 & 0.8 & 0.2 \\ 0.4 & 0.4 & 0.8 & 1 & 0 \\ 0 & 0.4 & 0.2 & 0 & 1 \end{array} \right] \end{array}$$

DATA CLASSIFICATION METHOD AND APPARATUS, DEVICE AND STORAGE MEDIUM

CROSS-REFERENCE TO RELATED APPLICATIONS

The present application claims priority to Chinese Patent Application No. 202310155946.4, filed on Feb. 8, 2023, the content of which is incorporated herein by reference in its entirety.

TECHNICAL FIELD

The present disclosure relates to the technical field of data processing, in particular to a data classification method and an apparatus, a device and a storage medium.

BACKGROUND

At present, graph data is widely applied to various fields, and how to learn embedded representation of nodes included in the graph data plays a great role in a data analysis processing technology.

An existing data acquisition method has problems such as a certain defect, obscure data source, and data inaccuracy, so the relationships between the nodes in the graph data are usually uncertain but include many uncertainties. These uncertainties include: whether there is a connected relation between the nodes cannot be clearly determined, but there is one connection probability, and feature data corresponding to the nodes is inaccurate, so as to lead to low accuracy of embedded representation extracted from the nodes in the graph data containing an uncertain connection in the prior art.

SUMMARY

The present disclosure provides a data classification method and apparatus, a device and a storage medium, so as to partially solve the above problems in the prior art.

The present disclosure adopts the following technical solution:

the present disclosure provides a data classification method, including the following steps of:

Acquiring graph data, the graph data includes nodes, an edge between the nodes is used for representing connection probabilities between the nodes, and a respective node corresponds to different to-be-classified objects.

Determining, for the respective node included in the graph data, a neighbor node of the respective node in the graph data, and determining an initial feature of the respective node according to the attribute information of the respective node.

Determining a node similarity matrix according to the connection probabilities between the nodes and similarity between neighbor nodes of the nodes in the graph data, and embedding coding on the initial feature of the respective node to obtain an embedded coding feature of the respective node.

Decoding on the embedded coding feature of the respective node by a preset decoder to obtain a decoded feature.

Adjusting the embedded coding feature corresponding to the respective node to obtain an adjusted feature corresponding to the respective node, with a constraint condition that similarity between embedded coding features of higher-similarity nodes in the node similarity matrix is greater and that a deviation between the decoded feature and the initial feature corresponding to the respective node is smaller.

Classifying the to-be-classified objects according to the adjusted feature corresponding to the respective node.

Alternatively, the step of obtaining the graph data specifically includes:

Acquiring original data, the original data includes attribute data of the to-be-classified objects and incidence relation data between the to-be-classified objects.

Establishing the graph data according to the attribute data of the to-be-classified objects and the incidence relation data between the to-be-classified objects, the different to-be-classified objects correspond to the different nodes, and an edge between the different nodes is used for representing an incidence relation between the different nodes in the graph data.

Alternatively, the step of determining, for the respective node included in the graph data, the neighbor node of the respective node in the graph data specifically includes:

Determining, for the respective node comprised in the graph data, a node with a connected relation with the respective node belonging to a specified order in the graph data as a neighbor node of the respective node in the graph data.

Alternatively, the step of embedding coding on the initial feature of the respective node to obtain the embedded coding feature of the respective node specifically includes:

Inputting, for the respective node, the initial feature of the respective node into a preset embedded model, so as to determine an uncertain value of the respective node according to the initial feature of the respective node by the preset embedded model, and determine the embedded coding feature of the respective node according to the uncertain value.

Alternatively, the step of adjusting the embedded coding feature corresponding to the respective node, with the constraint condition that the similarity between the embedded coding features of the higher-similarity nodes in the node similarity matrix is greater, specifically includes:

Randomly sampling, for the respective node, from the nodes with a similarity corresponding to the respective node in the node similarity matrix being lower than a preset threshold value to obtain a plurality of nodes as sampling nodes corresponding to the respective node.

Adjusting the embedded coding features corresponding to the respective node, with a constraint condition that the higher a similarity corresponding to the respective node in the node similarity matrix of a respective sampling node among the sampling nodes is, and the greater a similarity between an embedded coding feature of the respective sampling node and the embedded coding feature of the respective node.

Alternatively, the step of the embedded coding feature corresponding to the respective node, with a constraint condition that the deviation between the decoded feature and the initial feature corresponding to the respective node is smaller specifically includes:

Determining, for the respective node, an uncertain value of the respective node according to the embedded coding feature corresponding to the respective node.

Determining a node deviation weight corresponding to the respective node according to the uncertain value of the respective node.

Adjusting, for the respective node, the embedded coding feature corresponding to the respective node with the constraint condition that the deviation between the decoded feature and the initial feature corresponding to the respective node is smaller according to the node deviation weight corresponding to the respective node, and the smaller the respective node deviation weight corresponding to the respective node is, the smaller the adjustment on the embedded coding feature corresponding to the respective node, with the constraint condition that the deviation between the decoded feature and the initial feature corresponding to the respective node is.

Alternatively, the step of adjusting the embedded coding feature corresponding to the respective node to obtain the adjusted feature corresponding to the respective node, with a constraint condition that similarity between embedded coding features of higher-similarity nodes in the node similarity matrix is greater, and that the deviation between the decoded feature and the initial feature corresponding to the respective node is smaller, specifically includes:

Determining, for the respective node, a first loss corresponding to the respective node according to the similarity between the embedded coding feature of the respective node and the embedded coding feature of each of further nodes in the node similarity matrix.

Determining a second loss corresponding to the respective node according to the deviation between the decoded feature and the initial feature corresponding to the respective node;

Determining the overall loss corresponding to the respective node according to a preset weight corresponding to the first loss and the second loss.

Adjusting the embedded coding feature corresponding to the respective node to obtain the adjusted feature corresponding to the respective node with a constraint condition that an overall loss corresponding to the respective node is smaller.

The present disclosure provides a data classification apparatus, including:

An acquisition module, configured to acquire graph data, the graph data includes the nodes, edges between the nodes are used for representing connection probabilities between the nodes, and the respective node corresponds to different to-be-classified objects.

A determination module, configured to determine a neighbor node of the respective node in the graph data for the respective node comprised in the graph data, and to determine an initial feature of the respective node according to attribute information of the respective node.

A feature extraction module, configured to determine the node similarity matrix according to the connection probabilities between the nodes, and similarity between neighbor nodes of the nodes in the graph data, and to embedded-encode on the initial feature of the respective node to obtain an embedded coding feature of the respective node.

A decoding module, configured to decode the embedded coding feature of the respective node by a preset decoder to obtain a decoded feature.

An adjustment module, configured to adjust the embedded coding feature corresponding to the respective node to obtain an adjusted feature corresponding to the respective node, with a constraint condition that a similarity between embedded coding features of higher-similarity nodes in the node similarity matrix is greater, and that a deviation between the decoded feature and the initial feature corresponding to the respective node is smaller.

A classification module, configured to classify the to-be-classified objects according to the adjusted feature corresponding to the respective node.

Alternatively, the acquisition module is specifically configured to acquire original data, the original data includes attribute data of the to-be-classified objects and incidence relation data between the to-be-classified objects; and establish the graph data according to the attribute data of the to-be-classified objects and the incidence relation data between the to-be-classified objects, the different to-be-classified objects correspond to the different nodes, and the edges between the different nodes are used for representing an incidence relation between the different nodes in the graph data.

Alternatively, the determination module is specifically configured to determine, for respective node included in the graph data, nodes having a connected relation belonging to a specified order with the respective node in the graph data as the neighbor node of the respective node in the graph data.

Alternatively, the feature extraction module is specifically configured to input, for the respective node, the initial feature of the respective node into a preset embedded model, so as to determine an uncertain value of the respective node according to the initial feature of the respective node by the preset embedded model and determine the embedded coding feature of the respective node according to the uncertain value.

Alternatively, the adjustment module is specifically configured to randomly sample, for the respective node, from the nodes with a similarity corresponding to the respective node in the node similarity matrix being lower than a preset threshold value to obtain a plurality of nodes as respective sampling nodes corresponding to the corresponding node; and to adjust the embedded coding features corresponding to the respective node, with a constraint condition that the higher a similarity corresponding to the respective node in the node similarity matrix of the respective sampling node among the sampling nodes is, the greater a similarity between the embedded coding feature of the respective sampling node and the embedded coding feature of the respective node is.

Alternatively, the adjustment module is specifically configured to determine, for the respective node, an uncertain value of the respective node according to the embedded coding feature corresponding to the respective node; determine a node deviation weight corresponding to the respective node according to the uncertain value of the respective node; and adjust, for the respective node, the embedded coding feature corresponding to the respective node with the constraint condition that the deviation between the decoded feature and the initial feature corresponding to the respective node is smaller according to the node deviation weight corresponding to the respective node, the smaller the node deviation weight corresponding to the respective node is, the smaller an adjustment on the embedded coding feature corresponding to the respective node with the constraint condition that the deviation between the decoded feature and the initial feature corresponding to the respective node is smaller is.

Alternatively, the adjustment module is specifically configured to determine, for the respective node, a first loss corresponding to the respective node according to the similarity between the embedded coding feature of the respective node and an embedded coding feature of each of further nodes in the node similarity matrix; to determine a second loss corresponding to the respective node according to the deviation between the decoded feature and the initial feature corresponding to the node; determine the overall loss corresponding to the respective node according to a preset weight corresponding to the first loss and the second loss; and to adjust the embedded coding feature corresponding to the respective node with a constraint condition that an overall loss corresponding to the respective node is smaller to obtain the adjusted feature corresponding to the respective node.

The present disclosure provides a computer-readable storage medium on which a computer program is stored, and the computer program, when executed by a processor, is configured to implement the above data classification method.

The present disclosure provides an electronic device, including a memory, a processor and a computer program stored on the memory and running on the processor, and the processor, when executing the program, is configured to implement the above data classification method.

At least one above technical solution adopted by the present disclosure can achieve the following beneficial effects:

In the data classification method provided by the present disclosure, first, the graph data including the nodes is acquired, the edges between the nodes are used for representing the connection probabilities between the nodes, and the respective node corresponds to the different to-be-classified objects; then for the respective node included in the graph data, the neighbor node of the respective node in the graph data is determined, and the initial feature of the respective node is determined according to the attribute information of the respective node; the node similarity matrix is determined according to the connection probabilities between the nodes and the similarity between the neighbor nodes of the nodes in the graph data, and the initial feature of the respective node is embedded coding to obtain the embedded coding feature of the respective node; the embedded coding feature of the respective node is decoded through a preset decoder to obtain a decoded feature; with the constraint condition that the similarity between the embedded coding features of the higher-similarity nodes in the node similarity matrix is greater and the deviation between the decoded feature and the initial feature corresponding to the respective node is smaller, the embedded coding feature corresponding to the respective node is adjusted to obtain the adjusted feature corresponding to the respective node; and the to-be-classified objects are classified according to the adjusted feature corresponding to the respective node.

It can be seen from the above method that a structural feature of the respective node in the graph data may be determined according to the neighbor node of the respective node in the graph data through the deviation between the decoded feature obtained by decoding the embedded coding feature of the respective node in the graph data and the initial feature of the respective node, and then the embedded coding feature corresponding to the respective node is adjusted according to the decoded feature of the respective node and the structural feature of the respective node in the graph data to obtain the adjusted feature corresponding to the respective node, so that accuracy of an obtained feature of the respective node is improved, and thus accuracy of data classification may be improved.

BRIEF DESCRIPTION OF DRAWINGS

Accompanying drawings described here are used for providing further understanding for the present disclosure and constitute a part of the present disclosure, and exemplary embodiments of the present disclosure and their descriptions are intended to explain the present disclosure instead of constituting an inappropriate limitation on the present disclosure. In the accompanying drawings.

DESCRIPTION OF EMBODIMENTS

In order to make objectives, technical solutions and advantages of the present disclosure clearer, the technical solutions in the present disclosure are clearly and completely described in the following with reference to specific embodiments of the present disclosure and the corresponding accompanying drawings. Apparently, the described embodiments are merely some rather than all of the embodiments of the present disclosure. All other embodiments obtained by those ordinarily skilled in the art based on the embodiments of the present disclosure without making creative efforts fall within the protection scope of the present disclosure.

The technical solutions provided in the various embodiments of the present disclosure are described in detail below with reference to the accompanying drawings.

Figure 1:
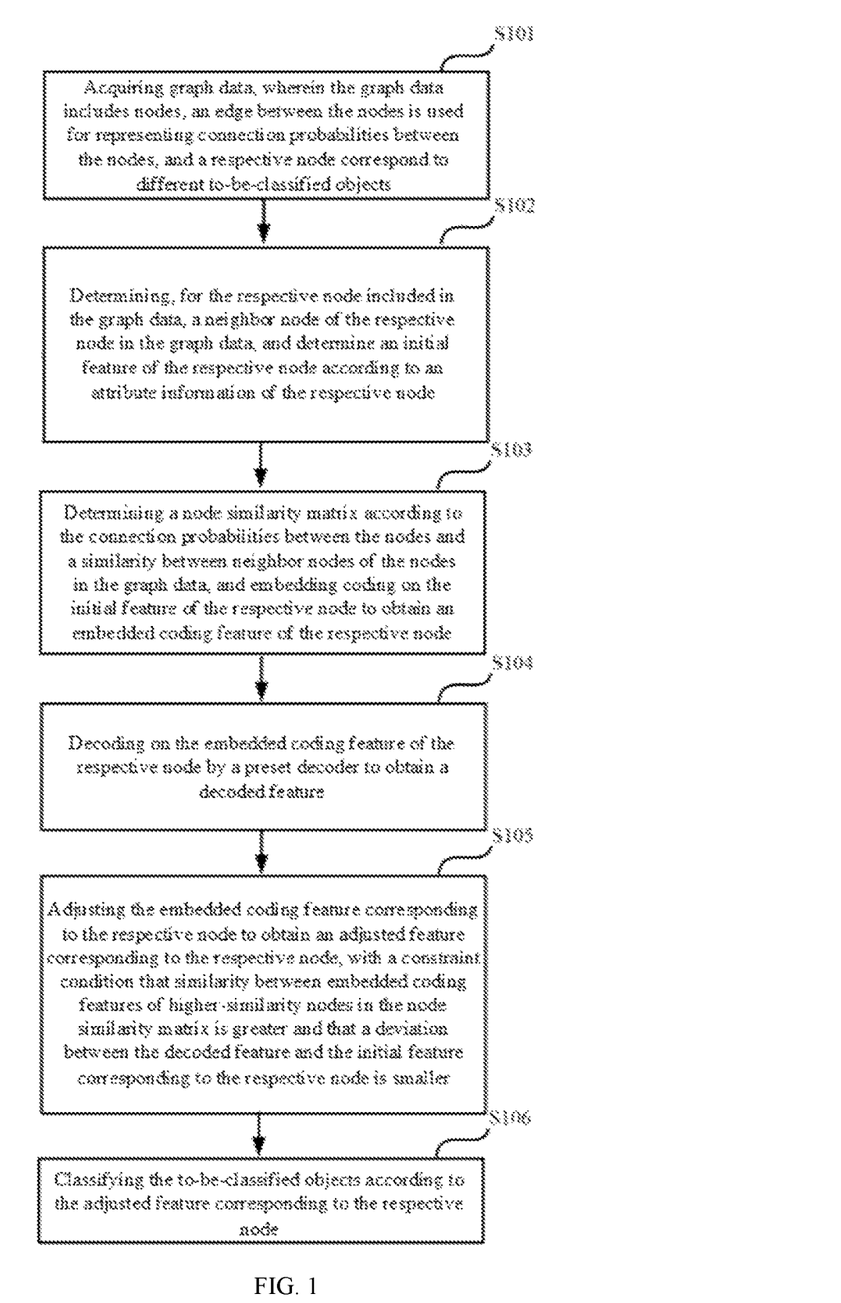
FIG. 1 is a schematic flowchart of a data classification method provided in the present disclosure.

FIG. 1 is a schematic flowchart of a data classification method provided in the present disclosure, including the following steps:

S101: the graph data is acquired, the graph data includes the nodes, the edges between the nodes are used for representing connection probabilities between the nodes, and the respective node corresponds to the different to-be-classified objects.

In the present disclosure, the service platform may acquire the original data and establish the graph data according to the original data, here, the original data includes the attribute data of the to-be-classified objects and the incidence relation data between the to-be-classified objects, and the to-be-classified object here may be determined according to the actual scene.

For example, if the service platform is the user thesis management platform, the above to-be-classified objects may be users, the attribute data of all the to-be-classified objects in the above original data may involve the attribute data of all the users, the attribute data here may be, for example, information such as the number of theses of each user, a title of a thesis and a user name, the incidence relation data between all the to-be-classified objects in the above original data may refer to incidence relation data between all the users, for example, the number of times of reference to theses between the users, and when two users refer to each other's thesis, it indicates that there is a reference incidence relation between the two users.

Figure 2:
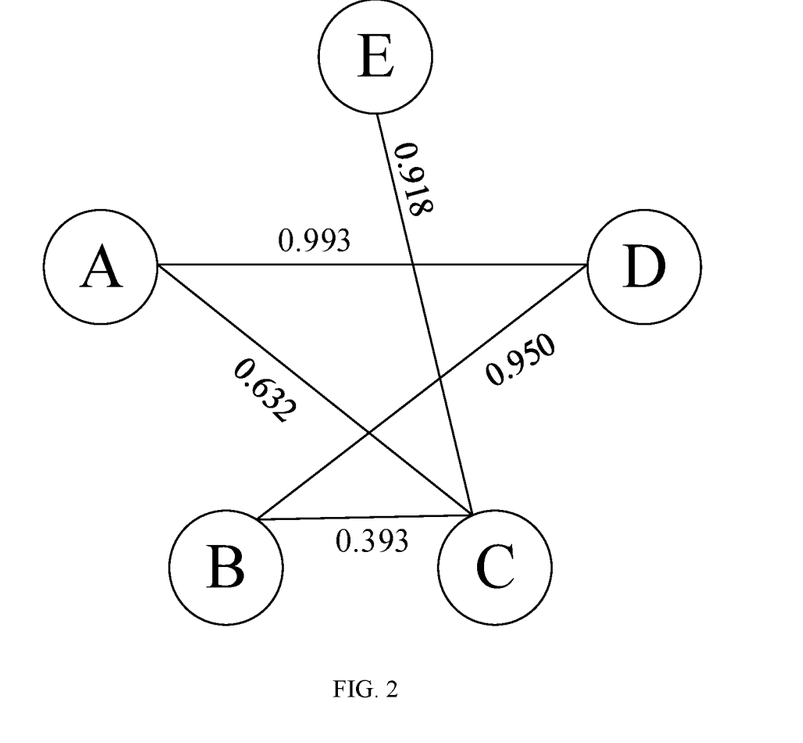
FIG. 2 is a schematic diagram of graph data provided in the present disclosure.

Further, the service platform may establish the graph data according to the attribute data of all the to-be-classified objects and the incidence relation data between all the to-be-classified objects, as shown in FIG. 2.

FIG. 2 is a schematic diagram of graph data provided in the present disclosure.

In FIG. 2, the graph data includes nodes corresponding to five to-be-classified objects, namely, A, B, C, D and E, an edge between any two nodes is used for representing that there is an incidence relation between the two nodes, and a numeral on the edge is used for representing a connection probability between the two nodes, for example, a connection probability between a node A and a node C is 0.632.

In the above content, the connection probability between the nodes may be determined according to the incidence relation data. The above content is described in detail below by taking the incidence relation data being the number of times of reference of theses as an example.

In an embodiment, a server may determine a connection probability of an edge between nodes corresponding to the two users in the graph data according to the number of times of mutual reference of theses between the two users, which may specifically refer to the following formula:

$$p(x) = 1 - e^{\frac{x}{2}}$$

In the above formula, p(x) is a connection probability between two nodes, and x is the number of times of mutual reference of theses between the two users.

It needs to be noted that the above connection probability corresponding to the edge between the two nodes is used for representing a probability that the two users corresponding to the two nodes have an incidence relation, for example, the greater the number of times of mutual reference to theses between the two users, the higher the probability that the two users have the incidence relation is, and the higher the connection probability corresponding to the edge between the two nodes corresponding to the two users in the graph data is.

In the present disclosure, an executive body for implementing the data classification method may be a specified device such as a server arranged in the service platform, or may further be a device such as a notebook computer, a desktop computer and a mobile phone. For convenient description, the data classification method provided in the present disclosure is described below only by taking the server being the executive body as an example.

S102: for the respective node included in the graph data, the neighbor node of the respective node in the graph data is determined, and the initial feature of the respective node is determined according to attribute information of the respective node.

Further, the server may determine, for the respective node included in the graph data, the respective node with a connected relation with the respective node belonging to the specified order in the graph data as the neighbor node of the respective node in the graph data.

The specified order is an order of the connected relation with the respective node, for example, it is assumed that the specified order is a first order, so it may be determined that other nodes directly connected with the respective node are first-order neighbor nodes of the respective node. For another example, it is assumed that the specified order is a second order, so it may be determined that a node connected with the first-order neighbor nodes of the respective node is a second-order neighbor node of the respective node, as shown in FIG. 2, the first-order neighbor nodes of the node A are a node C and a node D, the second-order neighbor nodes of the node A are the node C and the node D, and first-order neighbor nodes of the node C and the node C, namely, a node B and a node E, and so on, and a third-order neighbor node, a fourth-order neighbor node and the like of the node A may be determined, which will not be described in detail here in the present disclosure.

Besides, the server may further perform initial coding on the attribute information of the respective node according to the attribute information of the respective node so as to determine the initial feature of the respective node. The attribute information of the respective node here is attribute information of a to-be-classified object corresponding to the respective node.

It needs to be noted that when the server obtains the original data, as a data obtaining method may have a defect or a data source is obscure, or the like, the original data corresponding to the respective node obtained by the server may be inaccurate, and when accuracy of the original data corresponding to the respective node is low, an uncertain value corresponding to the initial feature of the respective node determined by the server is higher.

S103: the node similarity matrix is determined according to the connection probabilities between the nodes and the similarity between the neighbor nodes of the nodes in the graph data, and is embedded coding on the initial feature of the respective node to obtain the embedded coding feature of the respective node.

Further, the server may determine the node similarity matrix of the graph data according to the connection probabilities between the respective node and the similarity between the neighbor nodes of the nodes in the graph data, which may specifically refer to the following formula:

$$P_{sim} = (1-c)\sum_{i=0}^{t} \frac{c^i}{2^i} \sum_{i=0}^{i} \binom{i}{l}(P)^i(P^T)^{i-l}$$

In the above formula, P is a matrix of the connection probabilities between the nodes, c is a pre-defined parameter, and t is the specified order and may be set as 1, 2, . . . according to actual demands, namely the first order, the second order, . . . .

It may be seen from the above formula that for every two nodes among the nodes, the server may determine the node similarity matrix of the graph data according to similarity between the neighbor node of the specified order of one of the two nodes and the neighbor node of the specified order of the other of the two nodes and similarity between the connection probability between one of the two nodes and the neighbor node of each specified order thereof and the connection probability between the other of the two nodes and the neighbor node of each specified order thereof.

It needs to be noted that in the node similarity matrix of the graph data, the higher the similarity between neighbor nodes of any two nodes in the graph data is, and the higher the similarity between connection probabilities between the two nodes and each neighbor node thereof is, the higher the similarity of the two nodes in the node similarity matrix of the graph data is.

Figure 3:
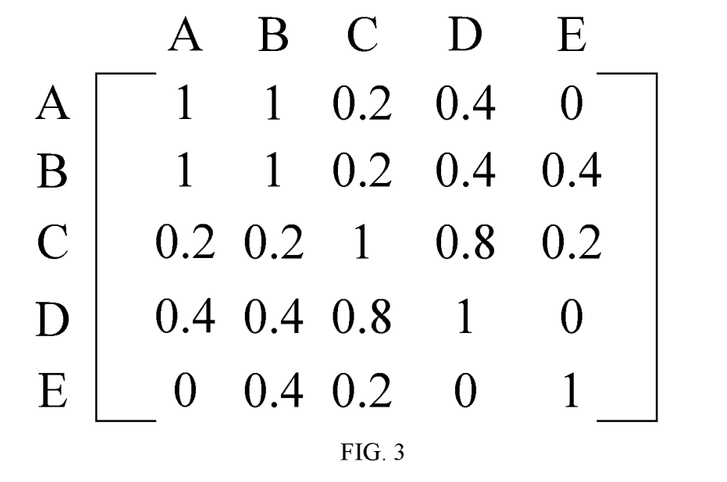
FIG. 3 is a schematic diagram of a similarity matrix provided in the present disclosure.

In an embodiment, the server may determine, for the respective node in the graph data, the similarity between the neighbor node of the respective node in the graph data and the neighbor node of each of further nodes in the graph data so as to determine the neighbor node of the graph data, as shown in FIG. 3.

FIG. 3 is a schematic diagram of a similarity matrix provided in the present disclosure.

In FIG. 3, the graph data includes five nodes A, B, C, D and E, a value 1 of a first row and a second column of the similarity matrix is similarity between the neighbor node of the node A in the graph data and a neighbor node of the node B in the graph data, and so on.

Besides, the server may input, for the respective node, the initial feature of the respective node into the preset embedded model, so as to determine the uncertain value of the respective node according to the initial feature of the respective node by the preset embedded model and determine the embedded coding feature of the respective node according to the uncertain value.

The above embedded model may be a Gaussian embedded model, the server may determine, for the respective node, the uncertain value of the respective node according to the initial feature of the respective node through the Gaussian embedded model and determine an embedded mean vector and an embedded variance vector of the respective node in a Gaussian distribution space according to the uncertain value, the greater the uncertain value of the respective node is, the greater the embedded variance vector of the respective node in the Gaussian distribution space is, which may specifically refer to the following formula:

$$\mu^{(0)} = Relu(XW_\mu^{(0)} + b_\mu^{(0)})$$
$$\sigma^{(0)} = Elu(XW_\sigma^{(0)} + b_\sigma^{(0)}) + 1$$

In the above content, $W_\mu^{(0)}$, $W_\sigma^{(0)}$, $b_\mu^{(0)}$ and $b_\sigma^{(0)}$ are trainable parameters of the Gaussian embedded model, $\mu^{(0)}$ is the embedded mean vector of the respective node in the Gaussian distribution space, and $\sigma^{(0)}$ is the embedded variance vector of the respective node in the Gaussian distribution space.

Further, the Gaussian embedded model may determine the embedded coding feature of the respective node according to the embedded mean vector and the embedded variance vector of the respective node in the Gaussian distribution space.

In order to solve uncertainty in a graph structure and meanwhile disclose latent dependency relationship between the nodes, use of an adaptable adjacent matrix $A_{adp}$=SoftMax(ReLU(EE*)) is provided, where E is a preset value. By defining a concealed relationship between learning nodes of the adaptable adjacent matrix, effectiveness of message propagation and node representation is improved, and node classification performance is further improved. By means of a pre-defined link and an adaptable latent graph dependency relationship, a node vector value in the Gaussian distribution space is learned through a double-layer GCN.

$$\overline{A} = \frac{\hat{A} + A_{adp}}{2}$$
$$\mu = \text{SoftMax}(\overline{A}ReLU(\overline{A}\mu^{(0)}W^{(0)})W^{(1)}),$$
$$\sigma = \text{SoftMax}(\overline{A}ReLU(\overline{A}\sigma^{(0)}W^{(0)})W^{(1)})$$

where $\overline{A}$ and $\hat{A}$ respectively represent an adjacent matrix combining a pre-defined graph structure and an adaptable graph structure and a normalized pre-defined adjacent matrix, and $W^{(0)}$ and $W^{(1)}$ are learning parameters.

S104: decoding is performed on the embedded coding feature of the respective node through the preset decoder to obtain the decoded feature.

It may be seen from the above content that when determining the embedded coding feature corresponding to the respective node, the server may consider the uncertain value of the initial feature of the respective node, which is determined in a mode of embedded coding, thus when decoding is performed on the embedded coding feature of the respective node through the preset decoder, a certain error exists between the obtained decoded feature and the initial feature of the respective node.

Based on this, the server may adjust, with the constraint condition that the deviation between the decoded feature and the initial feature corresponding to the respective node is smaller, the embedded coding feature corresponding to the respective node to obtain the adjusted feature corresponding to the respective node, and before this, the server may perform decoding on the embedded coding feature of the respective node through the preset decoder to obtain the decoded feature.

S105: with the constraint condition that similarity between the embedded coding features of higher-similarity nodes in the node similarity matrix is greater and the deviation between the decoded feature and the initial feature corresponding to the respective node is smaller, the embedded coding feature corresponding to the respective node is adjusted to obtain the adjusted feature corresponding to the respective node.

In the present disclosure, the server may obtain the sampling nodes corresponding to the respective node through the negative sampling method and then adjust the embedded coding features corresponding to the respective node, for the respective node and with the constraint condition that the higher the similarity corresponding to the respective node in the node similarity matrix of a respective sampling node among the sampling nodes is, the greater the similarity between the embedded coding feature of the respective sampling node and the embedded coding feature of the respective node is.

In an embodiment, the server may randomly sample, for the respective node, from the nodes with the similarity to the corresponding node in the node similarity matrix being lower than a preset threshold value to obtain a plurality of nodes as the sampling nodes corresponding to the respective node; and adjust the embedded coding features corresponding to the respective node is adjusted, with a constraint condition that the higher the similarity corresponding to the respective node in the node similarity matrix of a respective sampling node among the sampling nodes is, the similarity between the embedded coding feature of the sampling nodes and the embedded coding feature of the respective node is greater.

Besides, the server may further determine, for the respective node, the uncertain value of the respective node according to the embedded coding feature corresponding to the respective node; determine the node deviation weight corresponding to the respective node according to the uncertain value of the respective node; and adjust, for the respective node, the embedded coding feature corresponding to the respective node with the constraint condition that the deviation between the decoded feature and the initial feature corresponding to the respective node is smaller according to the node deviation weight corresponding to the respective node, the smaller the respective node deviation weight corresponding to the respective node is, the smaller the adjustment on the embedded coding feature corresponding to the respective node with the constraint condition that the deviation between the decoded feature and the initial feature corresponding to the respective node is.

It needs to be noted that the above two constraint conditions may be applied independently or jointly, in an embodiment, the server may adjust, with the constraint condition that the similarity between the embedded coding features of the higher-similarity nodes in the node similarity matrix is greater and the deviation between the decoded feature and the initial feature corresponding to the respective node is smaller, the embedded coding feature corresponding to the respective node to obtain an adjusted feature corresponding to the respective node.

In an embodiment, the server may determine, for the respective node, the first loss corresponding to the respective node according to the similarity between the embedded coding feature of the respective node and the embedded coding feature of each of further nodes in the node similarity matrix; determine the second loss corresponding to the respective node according to the deviation between the decoded feature and the initial feature corresponding to the respective node; determine the overall loss corresponding to the respective node according to the preset weight corresponding to the first loss and the second loss; and adjust the embedded coding feature corresponding to the respective node to obtain the adjusted feature corresponding to the respective node with a constraint condition that the overall loss corresponding to the respective node is smaller.

S106: the to-be-classified objects are classified according to the adjusted feature corresponding to the respective node.

Further, the server may classify the to-be-classified objects corresponding to the respective node according to similarity between the adjusted features corresponding to the respective node.

For example, it is assumed that each above node is a user node, so according to similarity between the adjusted features of the respective node, users corresponding to the respective node may be classified into a machine learning user node, a natural language processing user node, a neural network user node, a robot technology user node and the like.

It needs to be noted that the above classification method may further be to classify the to-be-classified objects according to the adjusted feature corresponding to the respective node by using a multi-layer perceptron (MLP).

It may be seen from the above content that the server may determine the embedded coding feature corresponding to the respective node according to uncertainty of the original data corresponding to the respective node through the embedded coding model, determine the node similarity matrix according to the connection probabilities between the respective node and the similarity between the neighbor node of the respective node in the graph data, and then adjust, with the constraint condition that the similarity between the embedded coding features of the higher-similarity nodes in the node similarity matrix is greater and the deviation between the decoded feature and the initial feature corresponding to the respective node is smaller, the embedded coding feature corresponding to the respective node to obtain the adjusted feature corresponding to the respective node, so that accuracy of classifying the to-be-classified objects according to the adjusted feature corresponding to the respective node is improved.

Figure 4:
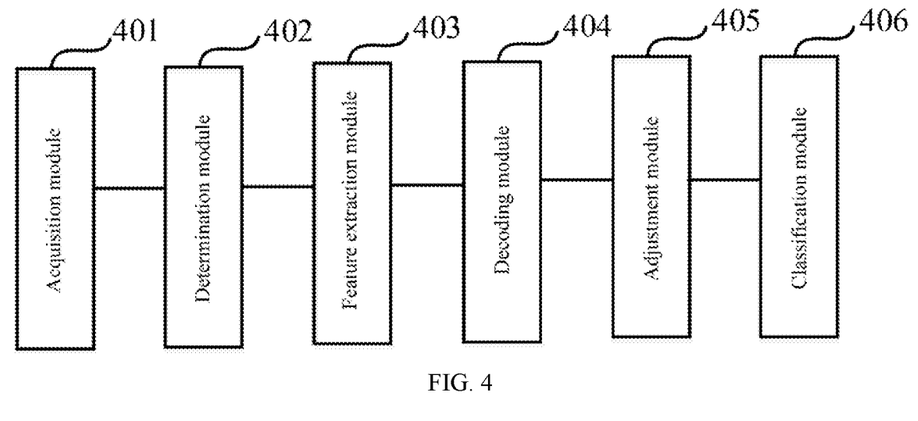
FIG. 4 is a schematic diagram of a data classification apparatus provided in the present disclosure.

The above is a data classification method provided by one or more embodiments of the present disclosure, and based on the same concept, the present disclosure further provides a corresponding data classification apparatus, as shown in FIG. 4.

FIG. 4 is a schematic diagram of a data classification apparatus provided in the present disclosure, including:

An acquisition module 401, configured to acquire the graph data, the graph data includes the nodes, the edges between the nodes are used for representing connection probabilities between the nodes, and the respective node corresponds to the different to-be-classified objects.

A determination module 402, configured to determine, the neighbor node of the respective node in the graph data for the respective node comprised in the graph data, and to determine the initial feature of the respective node according to attribute information of the respective node.

A feature extraction module 403, configured to determine the node similarity matrix according to the connection probabilities between the nodes and the similarity between neighbor nodes of the nodes in the graph data, and to embedded-encode on the initial feature of the respective node to obtain the embedded coding feature of the respective node.

A decoding module 404, configured to decode the embedded coding feature of the respective node through the preset decoder to obtain the decoded feature.

An adjustment module 405, configured to adjust the embedded coding feature corresponding to the respective node to obtain the adjusted feature corresponding to the respective node, with the constraint condition that the similarity between the embedded coding features of higher-similarity nodes in the node similarity matrix is greater, and that the deviation between the decoded feature and the initial feature corresponding to the respective node is smaller.

A classification module 406, configured to classify the to-be-classified objects according to the adjusted feature corresponding to the respective node.

Alternatively, the acquisition module 401 is specifically configured to acquire the original data, the original data includes the attribute data of the to-be-classified objects and the incidence relation data between the to-be-classified objects; and establish the graph data according to the attribute data of the to-be-classified objects and the incidence relation data between the to-be-classified objects, the different to-be-classified objects correspond to the different nodes, and the edges between the different nodes are used for representing the incidence relation between the different nodes in the graph data.

Alternatively, the determination module 402 is specifically configured to determine, for the respective node included in the graph data, the nodes having the connected relation belonging to a specified order with the respective node in the graph data as the neighbor node of the respective node in the graph data.

Alternatively, the feature extraction module 403 is specifically configured to input, for the respective node, the initial feature of the respective node into the preset embedded model, so as to determine an uncertain value of the respective node according to the initial feature of the respective node by the preset embedded model and determine the embedded coding feature of the respective node according to the uncertain value.

Alternatively, the adjustment module 405 is specifically configured to randomly sample, for the respective node, from the nodes with the similarity corresponding to the respective node in the node similarity matrix being lower than the preset threshold value to obtain a plurality of nodes as all sampling nodes corresponding to the corresponding node; and to adjust the embedded coding features corresponding to the respective node, with the constraint condition that the higher a similarity corresponding to the respective node in the node similarity matrix of the respective sampling node among the sampling nodes is, the greater the similarity between the embedded coding feature of the respective sampling node and the embedded coding feature of the respective node is.

Alternatively, the adjustment module 405 is specifically configured to determine, for the respective node, the uncertain value of the respective node according to the embedded coding feature corresponding to the respective node; determine the node deviation weight corresponding to the respective node according to the uncertain value of the respective node; and adjust, for the respective node, the embedded coding feature corresponding to the respective node with the constraint condition that the deviation between the decoded feature and the initial feature corresponding to the respective node is smaller according to the node deviation weight corresponding to the respective node, and the smaller the node deviation weight corresponding to the respective node is, the smaller the adjustment on the embedded coding feature corresponding to the respective node with the constraint condition that the deviation between the decoded feature and the initial feature corresponding to the respective node is smaller is.

Alternatively, the adjustment module 405 is specifically configured to determine, for the respective node, the first loss corresponding to the respective node according to the similarity between the embedded coding feature of the respective node and the embedded coding feature of each of further nodes in the node similarity matrix; to determine the second loss corresponding to the respective node according to the deviation between the decoded feature and the initial feature corresponding to the respective node; to determine the overall loss corresponding to the respective node according to the preset weight corresponding to the first loss and the second loss; and to adjust the embedded coding feature corresponding to the respective node with a constraint condition that the overall loss corresponding to the respective node is smaller to obtain the adjusted feature corresponding to the respective node.

The present disclosure further provides a computer-readable storage medium on which a computer program is stored, and the computer program is applicable to implement the above method provided in FIG. 1.

Figure 5:
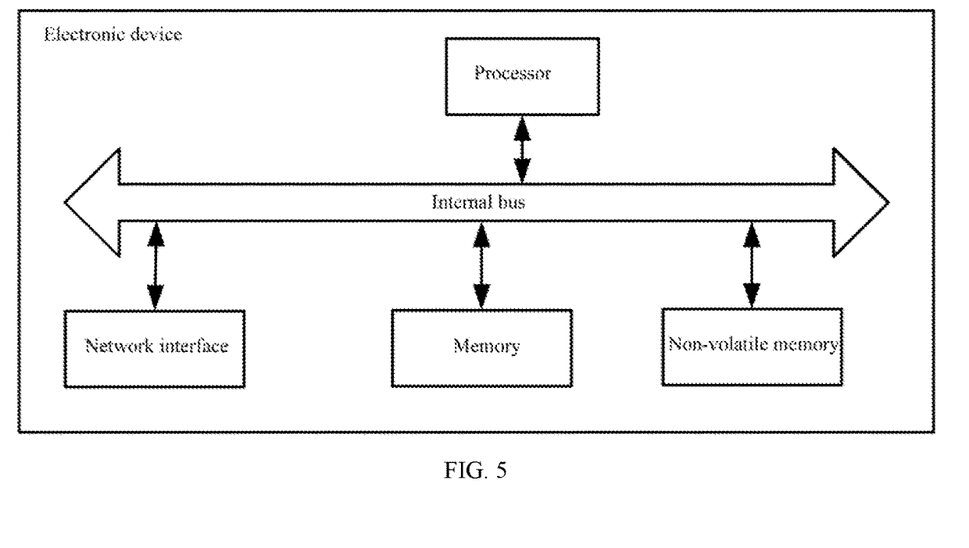
FIG. 5 is a schematic diagram of an electronic device corresponding to FIG. 1 provided in the present disclosure.

The present disclosure further provides a schematic structural diagram of an electronic device corresponding to FIG. 1 provided in the present disclosure shown in FIG. 5. As shown in FIG. 5, on a hardware level, the electronic device includes a processor, an internal bus, a network interface, an internal memory and a non-volatile memory and certainly may further include hardware needed by other services. The processor reads the corresponding computer program from the non-volatile memory into the internal memory to run, so as to implement the above method illustrated in FIG. 1.

Certainly, in addition to a software implementation mode, the present disclosure does not exclude other implementation modes, such as a logic device or software and hardware combined mode, that is, an executive body of the following processing flows is not limited to each logical unit, and may further be a hardware or logic device.

In 1990s, a technical improvement may be clearly distinguished as a hardware improvement (for example, improvement on a diode, a transistor, a switch and other circuit structures) or a software improvement (improvement on a method flow). However, with technical development, many existing improvements on method flows may have been regarded as a direct improvement on a hardware circuit structure. Almost all designers programmer the improved method flows into a hardware circuit to obtain a corresponding hardware circuit structure. Thus, it is possible to implement improvement on one method flow by means of a hardware entity module. For example, a programmable logic device (PLD) (for example, a field programmable gate array (FPGA)) is such type of integrated circuit, and its logical function is determined by a user through device programming. A designer "integrates" a digital system on a PLD through self-programming without the need of designing and fabricating a dedicated integrated circuit chip by a chip manufacturer. Besides, at present, replacing manual fabrication of an integrated circuit chip, this type of programming is mostly implemented by logic compiler software which is similar to a software compiler adopted during program development writing, an original code before compiling is further written by using a specific programming language, called a hardware description language (HDL), there are many types of HDL but not one, such as advanced boolean expression language (ABEL), altera hardware description language (AHDL), confluence, cornell university programming language (CUPL), HDCal, java hardware description language (JHDL), Lava, Lola, MyHDL, PALASM, and ruby hardware description language (RHDL), and very-high-speed integrated circuit hardware description language (VHDL) and Verilog are most popularly applied at present. Those skilled in the art should further make it clear that a hardware circuit for implementing logical method flows may be easily obtained only by making little logic programming for the method flows through several types of above hardware description languages and programming into the integrated circuit.

A controller may be implemented in any appropriate form, for example, the controller may be in a form of a microprocessor or a processor, a computer-readable medium storing a computer-readable program code (for example, software or firmware) capable of being executed by the (micro)processor, a logic gate, a switch, an application specific integrated circuit (ASIC), a programmable logic controller and an embedded microcontroller, examples of the controller include but are not limited to the following microcontrollers: ARC 625D, Atmel AT91SAM, Microchip PIC18F26K20 and Silicone Labs C8051F320, and a memory controller may further be implemented as a part of a control logic of a memory. Those skilled in the art are further aware that in addition to implementing the controller in a form of a pure computer-readable program code, logic programming may be made for the method steps so that the controller implements the same function in a form of the logic gate, the switch, the application specific integrated circuit, the programmable logic controller and the embedded microcontroller. Therefore, this type of controller may be regarded as a hardware component, and an apparatus included therein for implementing various functions may further be regarded as a structure in the hardware component. Or, the apparatus for implementing various functions may be even regarded as a software module for implementing the method or the structure in the hardware component.

A system, apparatus, module or unit described in the above embodiments may be specifically implemented through a computer chip or an entity, or implemented by a product with a certain function. A typical implementation device is a computer. In an embodiment, the computer may be, for example, a personal computer, a laptop computer, a cell phone, a camera phone, a smart phone, a personal digital assistant, a media player, a navigation device, an e-mail device, a game console, a tablet computer, a wearable device or any combination of these devices.

For convenient description, the above apparatus is described by various units in terms of functions respectively. Certainly, functions of the various units may be implemented on the same or more software and/or hardware during implementation of the present disclosure.

Those skilled in the art should understand that the embodiments of the present disclosure may be provided as a method, system, or computer program product. Thus, the present disclosure may be in a form of complete hardware embodiment, complete software embodiment or software and hardware combined embodiment. Besides, the present disclosure may adopt a form of a computer program product implemented on one or more computer applicable storage media (including but not limited to a disk memory, CD-ROM, an optical memory and the like) including a computer applicable program code.

The present disclosure is described with reference to flowcharts and/or block diagrams of the method, device (system), and computer program product according to the embodiments of the present disclosure. It should be understood that each flow and/or block in the flowcharts and/or block diagrams as well as a combination of flows and/or blocks in the flowcharts and/or block diagrams may be implemented through computer program instructions. These computer program instructions may be provided for a processor of a general-purpose computer, a special-purpose computer, an embedded processor or another programmable data processing device so as to generate a machine, so that an apparatus for implementing functions specified in one or more flows in the flowcharts and/or one or more blocks in the block diagrams is generated through instructions executed by the processor of the computer or another programmable data processing device.

These computer program instructions may further be stored in a computer-readable memory capable of guiding a computer or another programmable data processing device to work in a specific mode, so that the instructions stored in the computer-readable memory generate a manufacture including an instruction apparatus, and the instruction apparatus implements the functions specified in one or more flows in the flowcharts and/or one or more blocks in the block diagrams.

These computer program instructions may further be loaded to a computer, or another programmable data processing device, so that a series of operating steps may be performed on the computer or another programmable device to produce a computer-implemented processing, such that the instructions executed on the computer or the another programmable device provide steps for implementing the functions specified in one or more flows in the flowcharts and/or one or more blocks in the block diagrams.

In a typical configuration, a computing device includes one or more central processing units (CPUs), an input/output interface, a network interface and an internal memory.

The internal memory may include a form such as a volatile memory, a random access memory (RAM) and/or a volatile internal memory in the computer-readable medium, such as a read-only memory (ROM) or a flash RAM. The internal memory is an example of the computer-readable medium.

The computer-readable medium includes non-volatile and volatile, mobile and removable media capable of implementing information storage in any method or technology. Information may be the computer-readable instructions, a data structure, program modules or other data. Examples of storage media of the computer include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another internal memory technology, a compact disc read-only memory, a digital versatile disc (DVD) or another optical memory, a magnetic cassette tape, a magnetic tape disk memory or another magnetic storage device or any other non-transmitting medium, being applicable to storing information that the computing device may access. According to definition herein, the computer-readable medium does not include transitory media, such as a modulated data signal and a carrier wave.

It needs to be further noted that terms "include", "comprise" or any other variants thereof are intended to cover non-exclusive including, so that a process, method, commodity or device including a series of elements include not only those elements, but further other elements not listed explicitly, or further include elements inherent to the process, method, commodity or the device. Without more limitations, elements defined by the sentence "including one . . . " does not exclude that there are still other same elements in the process, method, commodity, or device including the elements.

Those skilled in the art should understand that the embodiments of the present disclosure may be provided as a method, system, or computer program product. Thus, the present disclosure may be in a form of complete hardware embodiment, complete software embodiment or software and hardware combined embodiment. Besides, the present disclosure may adopt a form of a computer program product implemented on one or more computer applicable storage media (including but not limited to a disk memory, CD-ROM, an optical memory and the like) including a computer applicable program code.

The present disclosure may be described in general context of the computer executable instructions executed by the computer, for example, a program module. In general, the program module includes a routine, a program, an object, an assembly, a data structure and the like that execute specific task or implement a specific abstract data type. The present disclosure may further be implemented in distributed computing environments, and in these distributed computing environments, a task is executed by a remote processing device connected through a communication network. In the distributed computing environments, the program module may be located in a local and remote computer storage medium including a storage device.

The various embodiments in the present disclosure are described in a progressive mode, the same or similar parts among the embodiments may refer to one another, and what is mainly described in each embodiment is different from other embodiments. Especially, as for the system embodiment, the system embodiment is basically similar to the method embodiment, so the system embodiment is simply described, and related parts may refer to a part of description of the method embodiment.

The foregoing descriptions are merely embodiments of the present disclosure and are not intended to limit the present disclosure. There may be various modifications and changes of the present disclosure to those skilled in the art. Any modification, equivalent replacement, improvement or the like made within the spirit and principle of the present disclosure shall fall within the scope of the claims of the present disclosure.

What is claimed is:

1. A data classification method, comprising:
   acquiring graph data, wherein the graph data comprises nodes, an edge between the nodes is used for representing connection probabilities between the nodes, and a respective node corresponds to different to-be-classified objects;
   determining, for the respective node comprised in the graph data, a neighbor node of the respective node in the graph data, and determining an initial feature of the respective node according to an attribute information of the respective node;

determining a node similarity matrix according to the connection probabilities between the nodes and a similarity between neighbor nodes of the nodes in the graph data, and embedding coding on the initial feature of the respective node to obtain an embedded coding feature of the respective node;

decoding on the embedded coding feature of the respective node by a preset decoder to obtain a decoded feature;

adjusting the embedded coding feature corresponding to the respective node to obtain an adjusted feature corresponding to the respective node, with a constraint condition that similarity between embedded coding features of higher-similarity nodes in the node similarity matrix is greater, and that a deviation between the decoded feature and the initial feature corresponding to the respective node is smaller; and classifying the to-be-classified objects according to the adjusted feature corresponding to the respective node.

2. The method according to claim 1, wherein said acquiring graph data further comprises:

acquiring original data, wherein the original data comprises attribute data of the to-be-classified objects and incidence relation data between the to-be-classified objects; and establishing the graph data according to the attribute data of the to-be-classified objects and the incidence relation data between the to-be-classified objects, wherein the different to-be-classified objects correspond to the nodes, and an edge between the nodes is used for representing an incidence relation between the nodes in the graph data.

3. The method according to claim 1, wherein said determining, for the respective node comprised in the graph data, a neighbor node of the respective node in the graph data further comprises:

determining, for the respective node comprised in the graph data, nodes with a connected relation with the respective node belonging to a specified order in the graph data as the neighbor node of the respective node in the graph data.

4. The method according to claim 1, wherein said embedding coding on the initial feature of the respective node to obtain the embedded coding feature of the respective node further comprises:

inputting, for the respective node, the initial feature of the respective node into a preset embedded model, so as to determine an uncertain value of the respective node according to the initial feature of the respective node by the preset embedded model, and determine the embedded coding feature of the respective node according to the uncertain value; and meanwhile defining an adaptable adjacent matrix to learn a latent relationship between the nodes.

5. The method according to claim 1, wherein said adjusting the embedded coding feature corresponding to the respective node, with a constraint condition that similarity between the embedded coding features of higher-similarity nodes in the node similarity matrix is greater, further comprises:

randomly sampling, for the respective node, from nodes with a similarity corresponding to the respective node in the node similarity matrix being lower than a preset threshold value to obtain a plurality of nodes as sampling nodes corresponding to the respective node; and adjusting the embedded coding features corresponding to the respective node, with a constraint condition that the higher a similarity corresponding to the respective node in the node similarity matrix of a respective sampling node among the sampling nodes is, the greater a similarity between an embedded coding feature of the respective sampling node and the embedded coding feature of the respective node is.

6. The method according to claim 1, wherein said adjusting the embedded coding feature corresponding to the respective node, with a constraint condition that the deviation between the decoded feature and the initial feature corresponding to the respective node is smaller, further comprises:

determining, for the respective node, an uncertain value of the respective node according to the embedded coding feature corresponding to the respective node;

determining a node deviation weight corresponding to the respective node according to the uncertain value of the respective node; and adjusting, for the respective node, the embedded coding feature corresponding to the respective node with the constraint condition that the deviation between the decoded feature and the initial feature corresponding to the respective node is smaller according to the node deviation weight corresponding to the respective node, wherein the smaller the respective node deviation weight corresponding to the respective node is, the smaller an adjustment on the embedded coding feature corresponding to the respective node, with the constraint condition that the deviation between the decoded feature and the initial feature corresponding to the respective node is.

7. The method according to claim 1, wherein said adjusting the embedded coding feature corresponding to the respective node to obtain the adjusted feature corresponding to the respective node, with a constraint condition that similarity between embedded coding features of higher-similarity nodes in the node similarity matrix is greater, and that the deviation between the decoded feature and the initial feature corresponding to the respective node is smaller, comprises:

determining, for the respective node, a first loss corresponding to the respective node according to the similarity between the embedded coding feature of the respective node and an embedded coding feature of each of further nodes in the node similarity matrix;

determining a second loss corresponding to the respective node according to the deviation between the decoded feature and the initial feature corresponding to the respective node;

determining an overall loss corresponding to the respective node according to a preset weight corresponding to the first loss and the second loss; and adjusting the embedded coding feature corresponding to the respective node to obtain the adjusted feature corresponding to the respective node with a constraint condition that the overall loss corresponding to the respective node is smaller.

8. A data classification apparatus, comprising:

an acquisition module, configured to acquire graph data, wherein the graph data comprises nodes, an edge between the nodes is used for representing connection probabilities between the nodes, and a respective node corresponds to different to-be- classified objects;

a determination module, configured to determine a neighbor node of the respective node in the graph data for the respective node comprised in the graph data, and to determine an initial feature of the respective node according to an attribute information of the respective node;

a feature extraction module, configured to determine a node similarity matrix according to the connection probabilities between the nodes, and a similarity between neighbor nodes of the nodes in the graph data, and to embedded-encode on the initial feature of the respective node, to obtain an embedded coding feature of the respective node;

a decoding module, configured to decode the embedded coding feature of the respective node by a preset decoder to obtain a decoded feature;

an adjustment module, configured to adjust the embedded coding feature corresponding to the respective node to obtain an adjusted feature corresponding to the respective node, with a constraint condition that a similarity between the embedded coding features of higher-similarity nodes in the node similarity matrix is greater, and that a deviation between the decoded feature and the initial feature corresponding to the respective node is smaller; and a classification module, configured to classify the to-be-classified objects according to the adjusted feature corresponding to the respective node.

9. The apparatus according to claim 8, wherein the acquisition module is further configured to acquire original data, wherein the original data comprises attribute data of the to-be-classified objects and incidence relation data between the to-be-classified objects; and establish the graph data according to the attribute data of the to-be-classified objects and the incidence relation data between the to-be-classified objects, and wherein the different to-be-classified objects correspond to the nodes, and edges between the nodes are used for representing an incidence relation between the nodes in the graph data.

10. The apparatus according to claim 8, wherein the determination module is further configured to determine, for the respective node comprised in the graph data, nodes having a connected relation belonging to a specified order with the respective node in the graph data as a neighbor node of the respective node in the graph data.

11. The apparatus according to claim 8, wherein the feature extraction module is further configured to input, for the respective node, the initial feature of the respective node into a preset embedded model, so as to determine an uncertain value of the respective node according to the initial feature of the respective node by the preset embedded model and determine the embedded coding feature of the respective node according to the uncertain value.

12. The apparatus according to claim 8, wherein the adjustment module is further configured to randomly sample, for the respective node, from nodes with a similarity corresponding to the respective node in the node similarity matrix being lower than a preset threshold value to obtain a plurality of nodes as respective sampling nodes corresponding to the corresponding node; and to adjust the embedded coding features corresponding to the respective node, with a constraint condition that the higher a similarity corresponding to the respective node in the node similarity matrix of a respective sampling node among the sampling nodes is, the greater a similarity between an embedded coding feature of the respective sampling node and the embedded coding feature of the respective node is.

13. The apparatus according to claim 8, wherein the adjustment module is further configured to determine, for the respective node, an uncertain value of the respective node according to the embedded coding feature corresponding to the respective node; determine a node deviation weight corresponding to the respective node according to the uncertain value of the respective node; and adjust, for the respective node, the embedded coding feature corresponding to the respective node with the constraint condition that the deviation between the decoded feature and the initial feature corresponding to the respective node is smaller according to the node deviation weight corresponding to the respective node, wherein the smaller the node deviation weight corresponding to the respective node is, the smaller an adjustment on the embedded coding feature corresponding to the respective node with the constraint condition that the deviation between the decoded feature and the initial feature corresponding to the respective node is smaller is.

14. The apparatus according to claim 8, wherein the adjustment module is further configured to determine, for the respective node, a first loss corresponding to the respective node according to the similarity between the embedded coding feature of the respective node and an embedded coding feature of each of further nodes in the node similarity matrix; to determine a second loss corresponding to the respective node according to the deviation between the decoded feature and the initial feature corresponding to the respective node; to determine an overall loss corresponding to the respective node according to a preset weight corresponding to the first loss and the second loss; and to adjust the embedded coding feature corresponding to the respective node with a constraint condition that the overall loss corresponding to the respective node is smaller to obtain the adjusted feature corresponding to the respective node.

15. A non-transitory computer-readable storage medium on which a computer program is stored, wherein the computer program, when executed by a processor, is configured to implement a data classification method, the method comprising:

acquiring graph data, wherein the graph data comprises nodes, an edge between the nodes is used for representing connection probabilities between the nodes, and a respective node corresponds to different to-be-classified objects;

determining, for the respective node comprised in the graph data, a neighbor node of the respective node in the graph data, and determining an initial feature of the respective node according to an attribute information of the respective node;

determining a node similarity matrix according to the connection probabilities between the nodes and a similarity between neighbor nodes of the nodes in the graph data, and embedding coding on the initial feature of the respective node to obtain an embedded coding feature of the respective node;

decoding on the embedded coding feature of the respective node by a preset decoder to obtain a decoded feature;

adjusting the embedded coding feature corresponding to the respective node to obtain an adjusted feature corresponding to the respective node, with a constraint condition that similarity between embedded coding features of higher-similarity nodes in the node similarity matrix is greater, and that a deviation between the decoded feature and the initial feature corresponding to the respective node is smaller; and classifying the to-be-classified objects according to the adjusted feature corresponding to the respective node.

\* \* \* \* \*